March 8, 1932. A. L. GENTER 1,848,945
GAS WASHING METHOD AND APPARATUS
Filed April 9, 1930 7 Sheets-Sheet 1

GAS →
LIQUID →

Inventor
ALBERT L. GENTER
By
Henry Love Clarke Attorney

March 8, 1932. A. L. GENTER 1,848,945
GAS WASHING METHOD AND APPARATUS
Filed April 9, 1930 7 Sheets-Sheet 2

Inventor
ALBERT L. GENTER.
By Henry Love Clarke Attorney

Inventor
ALBERT L. GENTER

By Henry Love Clarke
Attorney

March 8, 1932.  A. L. GENTER  1,848,945
GAS WASHING METHOD AND APPARATUS
Filed April 9, 1930   7 Sheets-Sheet 5

Inventor
ALBERT L. GENTER.
By Henry Love Clarke
Attorney

March 8, 1932. A. L. GENTER 1,848,945

GAS WASHING METHOD AND APPARATUS

Filed April 9, 1930 7 Sheets-Sheet 6

Inventor
ALBERT L. GENTER

By Henry Love Clarke
Attorney

March 8, 1932.  A. L. GENTER  1,848,945
GAS WASHING METHOD AND APPARATUS
Filed April 9, 1930  7 Sheets-Sheet 7
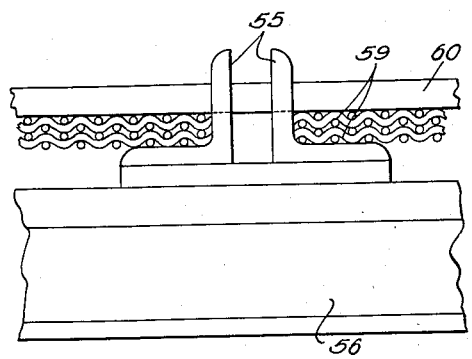
Fig. 9.
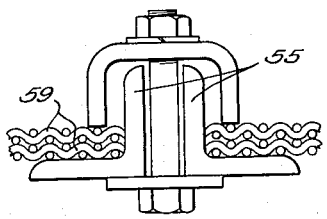
Fig. 10.
Fig. 13.
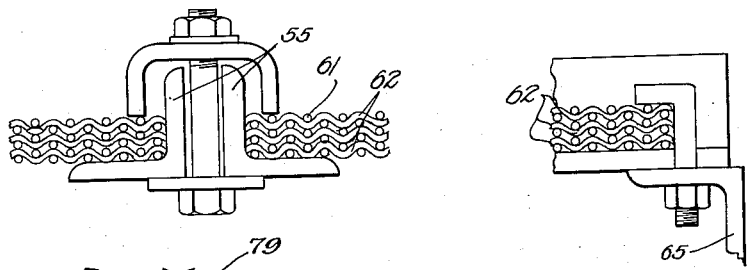
Fig. 14.
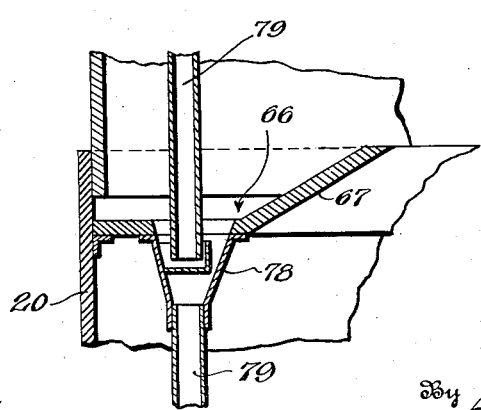
Fig. 15.
Inventor
ALBERT L. GENTER
By Henry Love Clarke
Attorney Patented Mar. 8, 1932

1,848,945

UNITED STATES PATENT OFFICE

ALBERT L. GENTER, OF BALTIMORE, MARYLAND, ASSIGNOR TO THE BARTLETT HAYWARD COMPANY, OF BALTIMORE, MARYLAND, A CORPORATION OF MARYLAND

GAS WASHING METHOD AND APPARATUS

Application filed April 9, 1930. Serial No. 442,896.

This invention relates in general to an improved method and apparatus for cleaning gases of dust and fume by contact with cooling liquids, and more particularly to an improved method and apparatus for removing both the coarser and finer fume and also the last traces of fine dust and fume from furnace gases, particularly blast furnace gases.

As is well known, fume consists of particles of chemical substances so finely dispersed in a gaseous dispersion medium that a relatively immense surface is presented to the gas space. Very fine dust particles suspended in gas have similar surface properties.

Fume and fine dust particles form remarkable adsorption nuclei for gases and, even though freshly formed, will become immediately coated with adsorbed films of air or gas, which prevent such particles from coalescing into larger aggregates. It is quite evident that water, or any other liquid spray, is also made up of fine droplets the surfaces of which are immediately surrounded by gaseous film, otherwise the droplets would also coalesce. The adsorbed film of gas or air on both the fume and fine dust particles and the similar film of gas or air on any liquid droplets prevent or retard the wetting of the fume particles by the water particles and therefore is greatly responsible for such fume and fine dust particles refusing to be wetted and precipitated by water in the form of spray or films.

As is well known, all of these fume and fine dust particles possess great surface energy and form excellent condensation nuclei for vapors, while larger dust particles, and particles of solids formed by disintegration, are less active as condensation and gas adsorption nuclei, and therefore are easier to wet by disintegrated water than are smoke or fume particles. The reason for this resides in the fact that the fume and fine dust have a much greater surface and consequent surface energy than do larger dust particles for a given weight of material.

The surface energy of fine dust and fume or smoke particles causes condensation of liquid vapors on these particles even at small supersaturations. Such particles with their moisture envelopes may then become fume-mist particles which are still difficult to precipitate because of the air or gas film that is rapidly attracted to their moist surfaces. Such fume-mist particles will then readily float and move in a gas stream uninfluenced by larger droplets of water or any fluid or water films that are in turn surrounded by a gas film.

Newly forming surfaces of disintegrated material are therefore extremely active. As a consequence, if, in treating furnace gases to remove the traces of fume, liquid droplets are disintegrated into fog surfaces freshly forming in the gas and are simultaneously violently mixed with fumy gas, contact between the fume and freshly forming fog surfaces and rapid precipitation of the fume and fine dust can be more readily and speedily brought about, because the freshly forming fog surfaces are just as free to attract fume particles as gas molecules. Furthermore, if the mixing means be violent enough it will aid in sufficiently disturbing the gas films about the fume particles to enhance the surface activities of the fume particles. If this fresh fog forming and violent mixing in the gas be combined with previous saturation of the gas with liquid vapor and subsequent cooling, it will be evident that the condensation on the fume nuclei will produce new and active moisture envelopes about the fume particles, thus augmenting the precipitating effect of the activity of the freshly forming fog and violent mixing of the gas. This is particularly true if condensation is carried on simultaneously with freshly forming fog and violent mixing of the condensation liquid directly in the gas current, since then condensation of the water vapor of the gas on fume particles will be effected simultaneously by the cooling effect of the condensation liquid and the activity of both the freshly forming fog surfaces and the fume surfaces, and coalescence of fume particles carrying condensate with other droplets into freshly forming complexes gradually increasing in size until large enough to precipitate in the gas current will be effected concurrently with the formation of their fresh surfaces and with the violent mixing and therefore precipitation of the fume in droplets large enough to drop out of the gas will be accelerated by the attraction of these complexes to each other by the activity of the surface energy of their freshly forming surfaces and the violent mixing of them with each other.

Objects of the present invention are to provide a method and apparatus for more effectively cleaning gases, such as blast furnace gas, of substantially all traces of even the finer dust and fume content thereof, without unduly increasing the back pressure and with a minimum of resistance to the flow of the gas, by a combination of a primary scrubbing out of the coarser dust with coarse water or liquid and a secondary cleaning of the finer fume therefrom by a succession of fresh fog forming and fume precipitating stages in each of which the gas is brought into contact with fresh cooling liquid being disintegrated into fog surfaces newly forming directly in the gas current, and is violently mixed with the fog during the forming of the new fog surfaces in the gas current; to accelerate thereby condensation on and coalescence of finer fume into drops large enough to precipitate in the gas current; to remove the precipitated drops of coalesced fume out of the gas current directly as they form in the successive fume precipitating stages; to effect saturation of the gas in the primary scrubbing stage to condition it for subsequent condensation in the respective secondary cleaning stages; to maintain the precipitated drops of fume and cooling liquid removed at the successive cleaning stages from returning to the other secondary cleaning stages; to effect the primary scrubbing, and saturation of the gas, in the primary stage with the liquid from the secondary stages, and to effect regulation of the temperature, and saturation of the gas, passing from the primary scrubbing operation to the secondary cleaning stages by controlling the quantity of such liquid supplied to the primary scrubbing stage; to effect such control by and in accordance with the temperature of the gas in the primary scrubbing stage; to effect condensation and fresh forming of fog from the liquid at each of the successive secondary cleaning stages with fresh cooling liquid for the respective stages; to accelerate growth of fume into droplets large enough to precipitate in the gas current by supplying the lowermost of the secondary cleaning stages with a greater quantity of the cooling liquid and decreasing quantities of such liquid to each of the succeeding stages; and to provide for more effective and complete removal of entrained moisture from the gas after it leaves the secondary cleaning stages. The invention further consists in such other new and useful improvements, and has for further objects such other operative advantages or results, as may be found to obtain in the method and apparatus hereinafter described or claimed.

In the accompanying drawings forming a part of this specification and showing for purposes of exemplification certain form and manner in which the invention may be embodied and practiced, but without limiting the claimed invention to such illustrative instances:

Fig. 9 is an end view taken on line 9—9 of Fig. 7;

Fig. 10 is a vertical cross-sectional view illustrating the manner of attaching the screens to the sectors;

Fig. 13 is a vertical sectional view taken on line 13—13 of Fig. 11;

Fig. 14 is a vertical sectional view taken on the line 14—14 of Fig. 11, illustrating the manner of fastening the screens at the periphery of the grid;

Fig. 15 is a detail section illustrating the passage of water from each pipe 79 through the trough 66.

In its present embodiment the invention is incorporated in a gas scrubber of the Feld type having gas scrubber features exemplified in, for instance, Patents Nos. 829,261, 940,103, and 1,636,963, and for convenience the following description of the present invention will be confined to this use of the invention. Features of the hereinafter described invention are however susceptible of other valuable application, such as for instance in combination with other types of scrubbers adapted for effecting primary scrubbing or film washing of gas with coarse water-streams to remove the coarser dust from the gas, and consequently the invention is not confined in its application to the specific use and specific embodiment herein described as an illustrative example.

Figure 2:
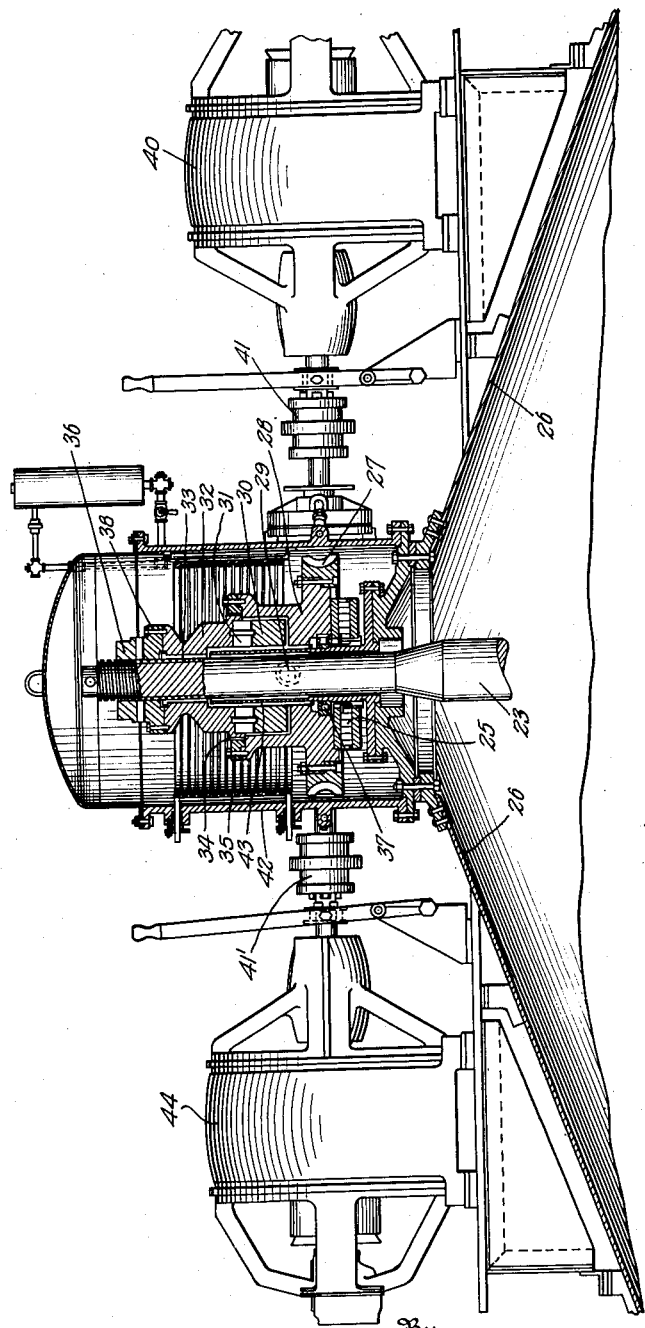
Fig. 2 is a vertical sectional view of the driving mechanism therefor.
Figure 3:
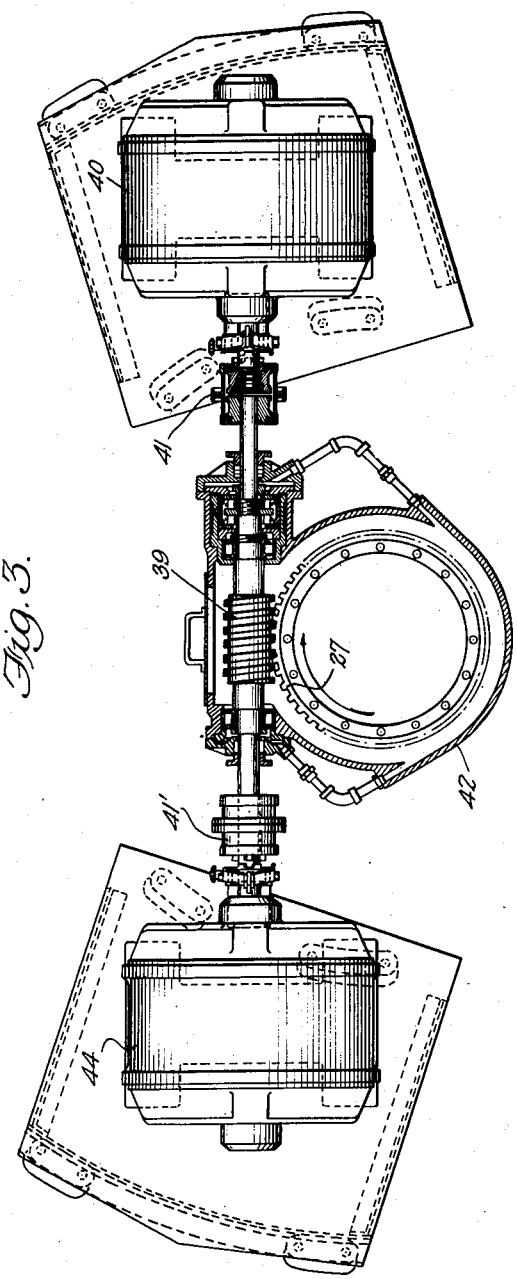
Fig. 3 is a top plan view of the same.
Figure 4:
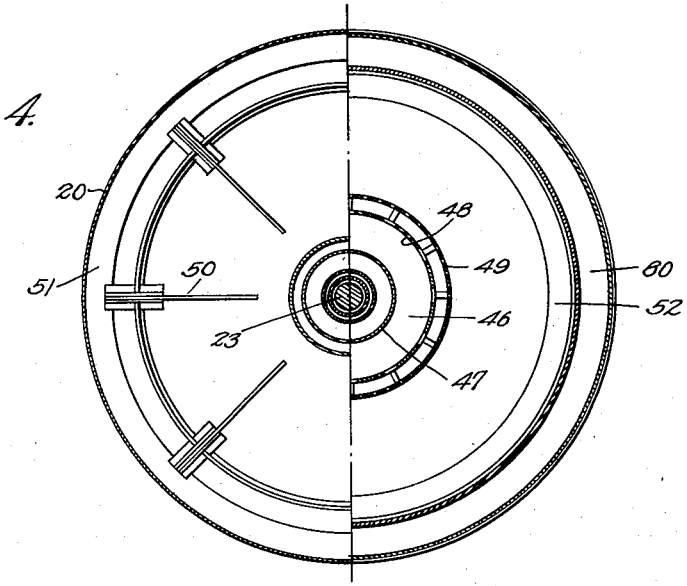
Fig. 4 is a horizontal cross-sectional view taken on the line 4—4 of Fig. 1, showing one of the cone sections and the special launder.

Referring to the drawings there is shown a gas scrubber of the above noted type embodying in its construction a vertical cylindrical shell 20 having a lower gas inlet 21 and an upper gas outlet 22 and having a rotatable shaft 23 extending axially through the shell. The shaft is centered at its lower end in an oil bearing 24 and is supported for rotation at its upper end by a bearing 25 (Fig. 2) resting upon the top closure 26 of the shell 20, and is operatively connected with mechanism for rotating the shaft in the following usual and well known manner of scrubbers of the aforesaid type. The bearing 25 supports a worm gear 27 which is connected with the shaft by members 28, 29, 30, 31, 32, 33 and 34. The member 28 bears against and is connected with the member 30 through a pair of oppositely disposed gimbles 29, and this member 30 is in turn connected with and supports the member 32 by another pair of oppositely disposed gimbles 31, which pair 31 is arranged at right angles to the first mentioned pair of gimbles 29. The member 32 is keyed to the shaft 23 at 33 and is flexibly connected with a member 35, fast to member 28, by means of a toothed flexible coupling 34. This manner of connecting the shaft 23 to the worm gear has been found in practice to be very effective in protecting the worm gear 27 against vibrations of the shaft due to the high speed at which it, and the parts for which it is adapted to rotate within the shell, are rotated. A bearing 37 is also usually provided to take up any side thrust load, and the upper portion of the shaft is usually threaded into a nut 36, which is normally secured to the member 32 by releasable bolts 38 so as to readily facilitate vertical adjustment of the shaft 23 and the members in the shell attached to said shaft, without disturbing the members 27, 28, 29, 30, 31 and 32, merely by turning said nut 36. The worm gear 27 is adapted to be driven at a relatively high speed by a worm 39 directly connected (Fig. 3) with a motor 40 by a flexible coupling 41. The speed of the motor 40 is usually determined by the diameter of the shell and the diameter of the members in the shell that are attached to the shaft 23 for rotation thereby. For example, the shell exemplified on the drawings is about 18′ 0″ in diameter and has capacity for washing approximately 80,000 cubic feet of gas per minute and, in the present embodiment of the invention, for reasons hereinafter pointed out, the shaft is preferably rotated at a rate of approximately 80 revolutions per minute. The entire driving mechanism is therefore, as usually, entirely submerged in an oil bath in a housing 42 and sealed against gas and oil leakage by a seal 43, and an auxiliary motor 44 is provided for alternative operation of one in place of the other.

For removing the coarser and more easily wetted dust from the gas there is provided, in the lower portion of the shell, means adapted for effecting a primary scrubbing of the gas with water so as both to free the gas of the greater portion of the dust and saturate it with water vapor for subsequent condensation. Preferably this primary gas scrubbing is effected by passing the gas through centrifuged horizontal curtains of water, although of course such primary scrubbing may be effected in other ways, as, for instance, by a heavy rain of water. In the present instance, this primary scrubbing of the gas is preferably produced by means of a plurality of cone sections 45 of the aforesaid Feld type which are admirably adapted for centrifuging water or other liquid into horizontal curtains of droplets into the path of the gas, and while three of such cone sections arranged one above the other are illustrated, one or more may be used in place of the three depending upon the quantity of coarse dust in the gas being treated.

For each cone section 45 there is provided a truncated cone 46 attached to the shaft 23 so as to rotate therewith and open at its bottom and top so as to receive liquid at its bottom and centrifuge it outwardly at its top. Each of the cones is provided, at its lower rim, with scoops or buckets 47 to accelerate the picking up of liquid for centrifuging, and each is perforated at its upper edge at 48 and connected with a perforated or slotted vertically disposed distributing cylinder 49. The cylinder 49 is disposed in spaced relation to and in line with the perforations 48 to receive liquid centrifuged out therethrough.

Each of the cone sections, except the lowest one, is also provided with a stationary water collecting and recirculating pan 50, supported from the wall of the shell 20 by supports 51 with a free space between its periphery and the shell for overflow of liquid (water) and passage of gas, and extending inwardly beneath the buckets or scoops of the cone so that the buckets may dip therein to pick up recirculated liquid. Each cone section is also provided with a downwardly inclined baffle 52 extending inwardly from the shell and disposed approximately opposite the lower edge of the cylinder 49 and above and over the pan 50, for returning liquid centrifuged out by the cones 46 to their respective pans 50 for recirculation to the scoops of the cones.

In operation, when the shaft 23 is rotated and the cones are revolved, the water in the pans 50 is picked up by the buckets 47 and forced up the inner surfaces of the cones 46 by the centrifugal force thereof and projected by such force horizontally through the perforations 48 and against and through the perforations of the distributing cylinder 49 during its rotation with its cone 46 and throwing it outwardly against the portion of the shell above its baffle 52 from whence it flows down to the baffle 52 and is returned to the pan 50 for recirculation by the cone. Preferably, the cylinders 49 are operated at a peripheral velocity of approximately 2000 feet per minute and consequently the jets of liquid leaving the cones are subdivided into relatively coarse spray having a high tangential velocity and forming several layers of droplets in the path of gas passing up around the periphery of the respective pans 50 from one cone section to the other. Water fed onto the inclined baffle 52 for the uppermost cone section, as from a secondary cleaning stage in the shell above the cone section, must therefore pass to the stationary pan 50 of the uppermost cone section and overflow the annular rim to the baffle 52 of the next lower cone section, and so on through each of the next lower cone sections until such water, with its dust and fume, reaches the bottom of the shell, where it must accumulate to a depth equal to that in the stationary pans 50 above before it overflows the liquid outlet connection 53 for discharge from the shell.

The hot gas to be cleaned, such as, for example, blast furnace gas, in passing into the shell from the inlet 21 meets the first spray from the lowermost cone section and is then forced by the cone sections to follow a tortuous passage while rising through said sections. After passing through the spray from the lowermost cone and while following the tortuous passage through the cone sections, it passes through a sheet of water overflowing the periphery of the pan 50 of the second cone section, and then passes through the water flowing down from the baffle 52 to said pan, towards the second cone, and then back toward the outer shell through the high velocity tangential spray from the second cone and the water overflowing from the periphery of the pan 50 of the third cone section and around the periphery of such pan to the third cone section, and so on through the third cone section. During such passage, the gas is subjected to and intimately mixed with a series of centrifuged tangential spray curtains and sheets of recirculating water and thereby imparts a considerable portion of its heat to the water, thus not only cooling the gas and heating the water but also saturating the gas with water vapor for subsequent condensation on the fumes of the gas. The dust is practically all scrubbed and precipitated out by such scrubbing in these cone sections, and is carried along with the overflowing water and discharged from the shell with the effluent overflowing the outlet 53 in the bottom of the shell.

The gas upon leaving the primary scrubbing stage, that is, passing from the uppermost cone section, while free of substantially all coarse or relatively heavy dust, still contains a small portion of the finest dust and any fume that may result from hot furnace operation. In addition to this the fine dust particles and fume particles are surrounded by a film of moisture or vapor and gas. In the case of blast furnace gas cleaning, this gas upon leaving the primary scrubbing stage may contain, aside from entrained moisture, from 0.1 to 0.3 grains per cubic foot of solids in the form of fume and fine dust, depending upon the character of the ore being treated in the blast furnace, the temperature of the furnace gas, and the kind of pig iron being smelted from the ore. This fume content may be and has been reduced to a content of approximately 0.07 grains per cubic foot by subjecting the gas after such primary scrubbing operation to further scrubbing and condensation in a further series of the aforesaid Feld cone sections or in further film washing stages.

But for certain purposes for which it is desired to use such blast furnace gas, this content of fume dust is far too high. For instance, in certain hot blast stoves, or other furnaces, in which the gas must pass through passages that have been made relatively small, in order to obtain a more effective heat recovery by reason of the large heat exchange surfaces, or in other furnaces in which the sizes of the passages are of necessity restricted to relatively small area, blast furnace gas is an excellent and relatively inexpensive fuel for such furnaces but, because of the dust content in the form of fume, can not be used for the reason that such fume clogs the passages prematurely. For such uses a fume content of from 0.005 to 0.01 is however permissible, since, with such content, clogging of such restricted passages does not take place with such rapidity as to render the use of such gas for the purpose uneconomical and consequently the reducing of the fume content to such proportions affords an outlet for such gas in furnaces in which it heretofore could not be used, and also affords opportunity for greater refinement in designing and operation of the hot blast stoves or regenerators employing blast furnace gas as fuel, to increase their heating efficiency and their heat regeneration.

It has been found, however, that the employment of the secondary cleaning steps of the method and apparatus hereinafter described in conjunction with the above described primary scrubbing steps will effect a reduction of the fume and dust content of the gas leaving the primary scrubbing operation and containing 0.1 to 0.3 grains per cubic foot to a content of from 0.005 to 0.01 grains per cubic foot, without increasing the back pressure on the gas or causing premature clogging as a result of such fine cleaning, and in addition will eliminate any entrained moisture and fog, thereby discharging from the gas scrubber a substantially dry blast furnace gas having a sufficiently small dust content as to warrant its use in many apparatus in which it has not been possible to use it heretofore.

Figures 8, 11, 12:
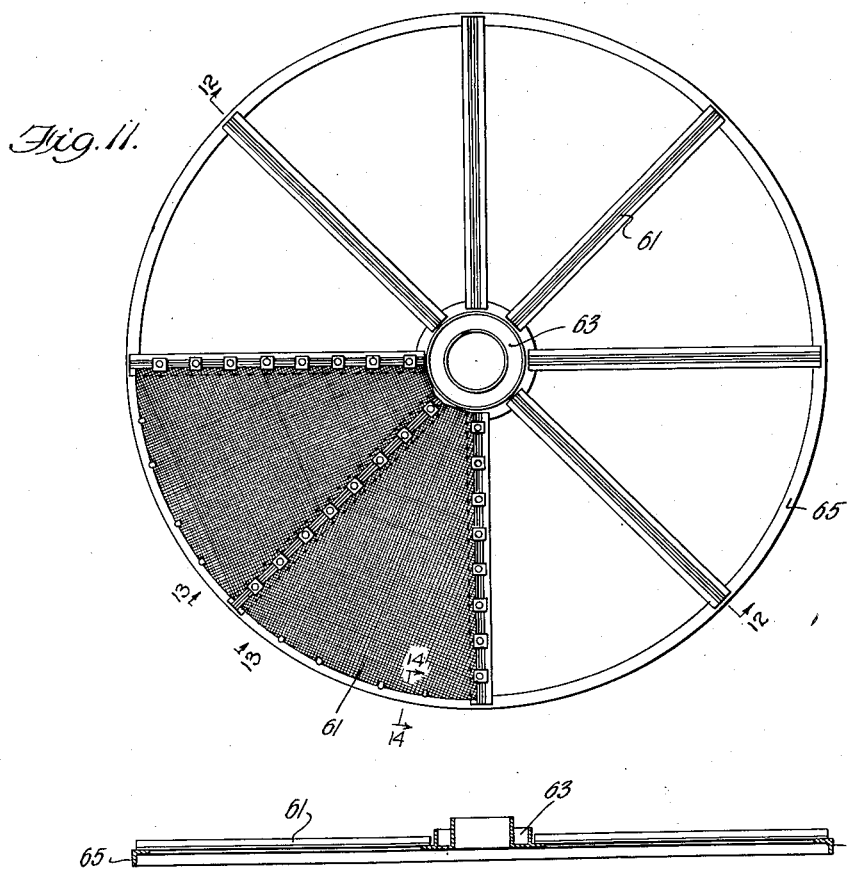
Fig. 8 is a vertical section thereof on line 8—8 of Fig. 7.
Fig. 11 is an enlarged plan view illustrating one of the stationary screen grids, parts being omitted for convenience.
Fig. 12 is a vertical cross-sectional view on the line 12—12 of Fig. 11.

In order to remove the last traces of fume and finer dust particles as well as the greater portions thereof from the gas after it has been scrubbed free of the readily precipitated coarse particles of dust there is provided in the portion of the shell above the primary scrubbing cone sections 45 and below the gas outlet 22 the following described construction for effecting the secondary cleaning in a succession of fog forming and fume precipitating stages in each of which the gas is brought into contact with fresh cooling liquid being disintegrated into fog surfaces newly forming in the gas current and is violently mixed with the fog surfaces during the forming of the new fog surfaces in the gas current and subsequently diffused through a stationary fume precipitating medium in which the gas is subjected to diffusion through intricate tortuous, but relatively free, passages. Secured to the shaft 23, at spaced intervals, one above the other, is a succession (Figs. 7–10) of spiders 54 each having supporting spokes 55 connected by a rim 56 and forming sectors 57 between the spokes 55 for carrying woven wire screen grids 58. Within the sectors between the spokes are mounted two or more horizontally disposed superimposed layers of mesh of woven heavy metallic-wire screens, or other similar foraminous material 59, so as to form a rotary foraminous grid structure, which will offer the gas a free but tortuous passage. The layers of screen are secured to the spokes as shown in Fig. 8 and are held down at the periphery of the grid by a ring 60. Each of the rotary grids 58 is provided with a stationary horizontal grid structure 61 arranged in parallel relationship therewith and made up in a manner similar to the rotary grids but with two or more superimposed layers 62 of foraminuous material similar to the material of the mesh of the rotary grids. The screens of the stationary grids are secured to the spokes 55 in the same manner as are the screens of the rotary grids, but at the periphery of the stationary grids the screens are secured by a plurality of clamps instead of a ring, as shown in Figs. 11 and 14.

Experience with the present apparatus has demonstrated that there should be more layers of screen, or more intricate passages, in the stationary grids 61 than in the rotatable grids 58, in order to provide more interfering surfaces against which entrainment of condensate and precipitate from the rotary grids 58 below such stationary grids 61, may lodge and collect, because these grids 61 are stationary. The number of layers chosen however will depend on the ease with which the particular gas being treated can be cleaned. In order to prevent gas from by-passing the stationary grids 61 during gas flow and to force all of the gas to pass through the meshes of the stationary grids 61, these grids are sealed at their inner periphery by a liquid seal comprising a trough 63 secured to the inner periphery of the stationary grids 61 and a bell 64 adapted to dip into liquid in the trough 63 and attached to and rotatable with the shaft upon rotation thereof. The stationary grids are firmly secured at their outer peripheries to the inside face of the shell by appropriate connections 65 and, as shown, in such manner as to prevent gas passing around the mesh of the stationary grids and thereby by-passing such grids.

A collecting trough 66 is provided opposite the outer periphery of each of the rotary grids 58 for collecting precipitated moisture centrifuged out against the shell by the respective rotary grids 58 and for maintaining the precipitate from returning back to the other secondary cleaning stages. As the liquid jets or spray, hereinafter described, are impacted against the rotary grids 58 during rapid rotation thereof a cloud of spray fog and water droplets will be centrifuged transversely of the flow of gas through the mesh of the superimposed layers of wire mesh and out of the gas current, leaving the outer periphery of the rotary grids in as many fine tangential curtains of water and fog as there are layers of wire mesh in the respective grids, and passing against and over the inner periphery 67 of the collecting trough. This together with the extra annular deflector 68 that extends downwardly from the outer periphery 67 of the grids will produce a dense mist-fog through which any small amount of gas that may by-pass the rotary grids 58 must pass and thereby minimize any tendency of the gas so to by-pass the rotary grids 58 as well as insure a cleansing seal for such gas.

To support the stationary grids 61 from sagging in their center, the rods or tension braces 69 are or may be connected, as illustrated, with the stationary grids at various points to their inner framework, and with the shell at 70.

The cooperating pairs of rotary and stationary grids are preferably arranged with the stationary grids of each pair closely above their respective rotary grids, and, in the preferred embodiment of the invention, the several pairs are so disposed as to have the space between the successive pairs of grids greater than the spaces between the individual members of the respective pairs. In this manner there is advantageously provided not only ample room for the location of the spray pipes 71 with appropriate upwardly directed nozzles 72 between each two successive pairs of grids, but also a reaction space 73 in which gas flowing from one pair of grids to another is cooled by diffusion and also loses considerable of its turbulence and has a lower velocity, thus giving the moisture saturation about remaining fume or dust nuclei, that is progressively condensing after leaving a previous pair of cooperating grids, more time in which to form larger mist droplets before being subjected to the effects of a next pair of grid structures.

Between each two successive pairs of the grids are provided a plurality of spray pipes 71 for delivery of fresh cooling liquid against the horizontal area of the respective rotary grids 58. Advantageously the spray pipes for the respective pairs of grids extend through manholes 74 and are connected with a manifold 75 that also serves the spray pipes for another pair of grids, and each pipe is provided with a controlling and regulating valve 76 and union 77 individual thereto, whereby the flow through each pipe may be individually controlled and the individual pipes 71 may be removed without disturbing the functioning of the others for the same grid pair.

Each spray pipe 71 is equipped with connections and spray nozzles 72 primarily adapted for projecting partially disintegrated liquid upwardly in the form of a fine spray directly against the bottoms of the grids 58 and into the meshes thereof during rapid rotation of the grids by the shaft 23, and concurrently with the passage of the gas through the meshes of said grids. This action not only effects disintegration of fresh cooling liquid into the form of a fog and thereby produces an enormous amount of freshly forming surface energy directly in the gas current at the different levels of the gas flow, but also centrifuges gas and fume thereof against the fresh fog surfaces during the forming thereof, thereby appreciably overcoming the tendency of the gas films, which envelope the fume and which of course begin to surround such fog surfaces as they form, to cause the fume and fog surfaces to repel each other, and effecting, by the concurrent action of centrifugal force, activity of fresh surface energy and heat exchange, an acceleration of both condensation on fume particles and coalescence and precipitation of fume surfaces carrying condensate into droplets of such size that they will not float further in the gas current but will be influenced by larger droplets of water present.

Other spray nozzles 72' are arranged to project sprays downwardly against the tops of the stationary grids 61, primarily to wash away moisture or droplets that have been entrained by the gas while passing through the rotating grid below and intercepted by the stationary grids. These intercepted particles coalesce and collect in sufficient quantities to utimately drip downward onto the rotating grids and be centrifuged thereby outwardly into the collecting troughs along with coalesced particles and droplets that are centrifuged out by the rotating grids before passing to the stationary grids.

It is important that the spray jets play, preferably upwardly, against at least two or three of the rotating grids at all times while gas is flowing therethrough and being cleaned. It is not so necessary that the spray jets play constantly downwardly against the stationary screen grids. Consequently the downward spraying of the stationary grids may be effected periodically and therefore spray pipes and nozzles separate from those for the upward spraying may be provided for such purpose.

Figure 1:
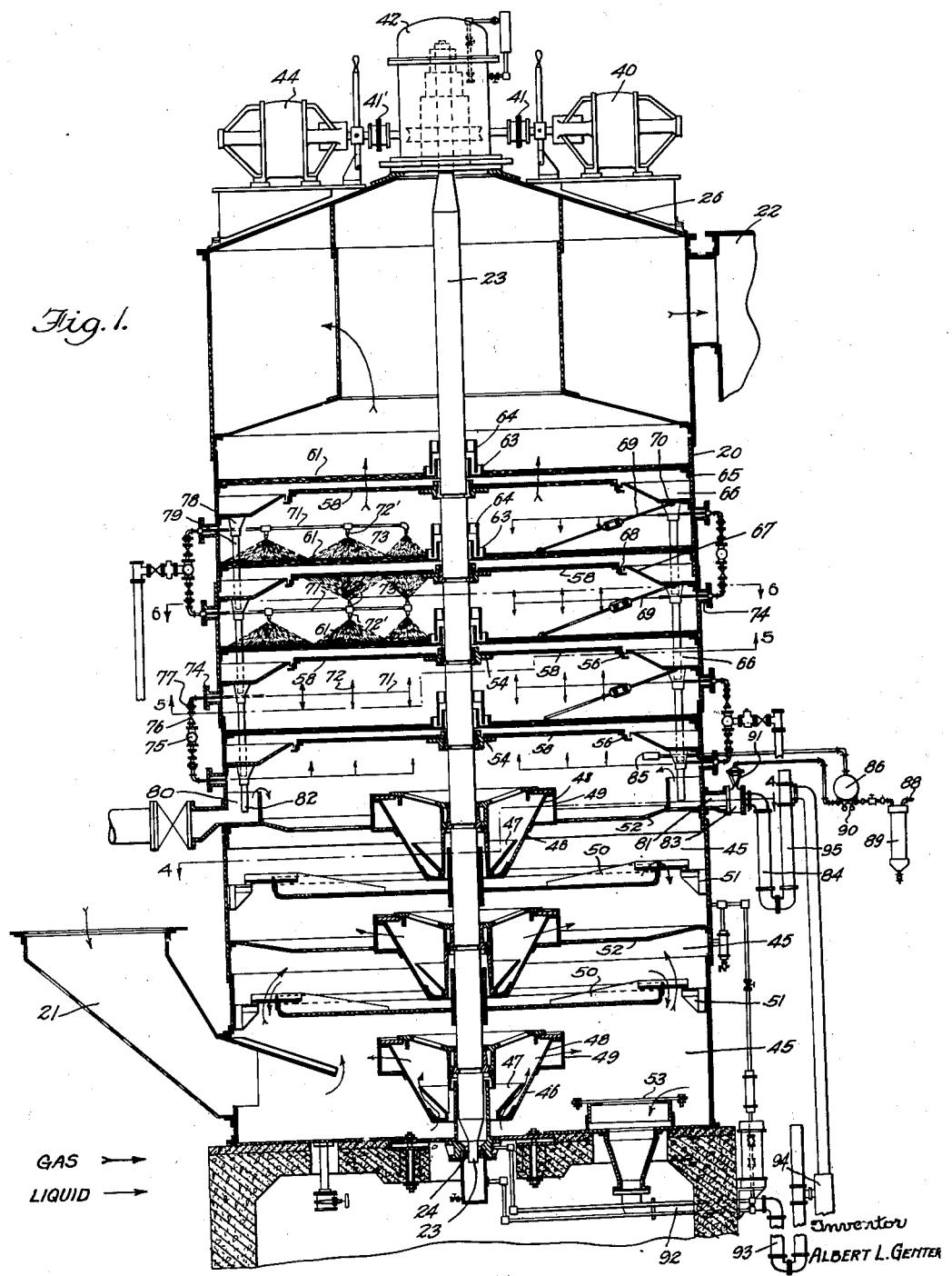
Figure 1 is a vertical cross-sectional view of a gas washer embodying the present invention.
Figure 5:
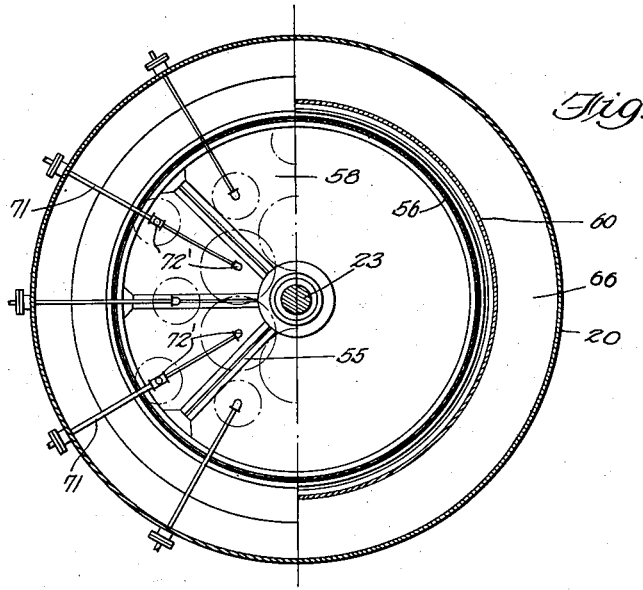
Fig. 5 is a horizontal cross-sectional view taken on the line 5—5 of Fig. 1 illustrating one of the rotary screen grids and collecting trough therefor and spray pipes and jets for the stationary screen grid therebelow.
Figure 6:
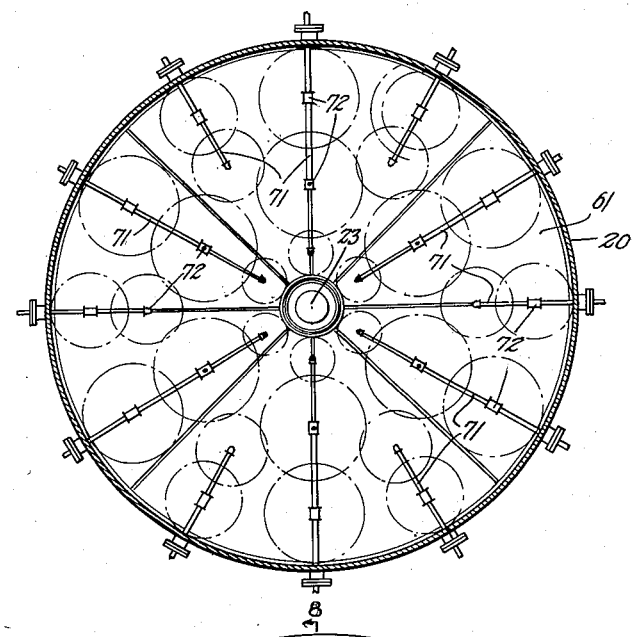
Fig. 6 is a horizontal cross-sectional view taken on the line 6—6 of Fig. 1 illustrating one of the stationary grids and the spray pipes and jets for the rotary screen grid thereabove.
Figure 7:
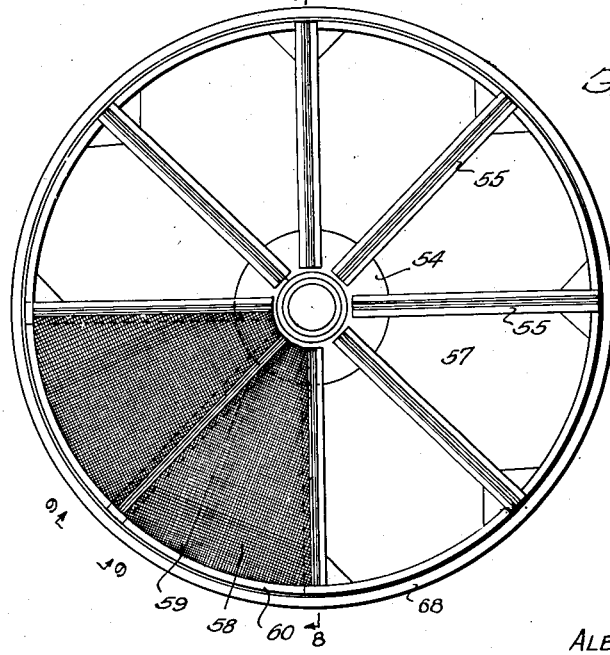
Fig. 7 is an enlarged plan view of one of the rotary screen grids, parts being omitted for clearness of illustration.

Due to the centrifugal force of the rotating grids 58, all intercepted coalescing particles caught on the meshes of said grids, while they are rapidly beating past the sprays, will be projected horizontally outwardly, thus gaining in velocity as they leave the center of the rotating grids. Therefore it is highly desirable that more of the disintegrated spray water being projected up against the bottoms of these grids be distributed, as indicated in Figs. 1 and 5, nearer the central portion thereof to provide a uniform distribution of spray over the surfaces of the rotary discs during their rotation, in order to present a uniform fog resistance to the flow of the gas. With the stationary elements it is better, during the spraying thereof, to apply more water nearer the periphery and lesser water near the center, as illustrated in Figs. 1 and 6, especially when the sprays therefor are in continuous operation for purpose of augmenting the gas cleaning, but when these sprays are to be operated intermittently merely to wash down the stationary grids, other means may be provided for such purpose such as, for instance, a high pressure hose connected by flexible joints with the shell so as to flush the stationary grids by moving the hose connections so as to cover certain sectors of the grids with the flushing liquid during the flushing action.

An important feature of the present invention is the individual control and ability so to control the volume of fresh sprayed liquid applied at each of the successive secondary cleaning stages. In cleaning, for instance hot blast-furnace gas with the method and apparatus of the present invention, it has been found particularly advantageous to apply more sprayed water to the first revolving grid directly above the top or last or uppermost revolving cone section than to the next succeeding rotary grid, and to apply progressively decreasing amounts at each of the succeeding rotary grids, until the last or uppermost section receives no sprayed liquid at all, thus effecting by the final cooperating unit or pair of stationary and rotary screen grids centrifugal elimination of even traces of entrained moisture and discharge from the shell of gas that is substantially free from entrained moisture.

To effectively carry out this novel principle, the valves 77 for the spray pipes 71 are advantageously adapted for being individually controlled, and in certain instances, to still further individualize this control, separate exterior manifolds are or may be provided for the respective units or pairs of rotary and stationary screen grids. In the latter event it is, in one manner of the practice of the present invention, distinctly advantageous to connect the individualized manifold to a common liquid supply source, and in another manner contemplated by the present invention, it is distinctly advantageous to provide separate sources of liquid for the respective manifolds. For instance, in the treatment of certain gases, or gases from a particular source, it is advantageous to use colder fresh liquid in the top manifold than in the bottom, and vice versa, and again with other gases, or gases from other sources, it is advantageous to add liquids of different chemical nature of or differing viscosity and surface tension properties, including reagents effecting surface energy, to the respective manifolds, because one of the primary purposes of the manifold and spray arrangement of the present invention is to effect release of surface energy directly in the gas current and the reagents effecting surface energy need not be added to all of the sprayed liquid against the successive units.

The purpose and advantages of confronting the gas leaving the lower primary gas scrubbing zone with more fresh spray liquid at the first of the secondary fog forming and fume precipitating units than is supplied to any one of the succeeding units will be more clearly understood from the following description of the gas flow through the secondary cleaning zone.

The gas passing out of the primary scrubbing zone leaves the last coarse centrifugal spray in the uppermost cone section relatively free of dust but containing the fume and some fine dust in finely dispersed particles surrounded by moisture and gas films. The gas is also saturated with moisture by the control of means hereinafter described for so controlling the temperature of the gas leaving the uppermost cone section that it will be saturated. The gas then is forced to pass rapidly through the multiple layers of beating and intercepting meshes of the rotating screen grid first, which centrifuges the gas passing therethrough, and then the stationary screen grid of the first lowermost fog forming and fume precipitating unit or pair of grids. Simultaneously with this gas current agitation the meshes beat the fine spray of fresh cooling liquid from the jets for the lowermost unit into a fine fog the particles of which, being freshly disintegrated directly into the gas current that is likewise being centrifuged, present innumerably freshly forming surfaces having a maximum of surface energy. In the case of blast furnace gases, these fresh fog particles are preferably colder than the gas itself so that the following reactions take place:

1. Heat exchange from the saturating vapors of the gas to the fresh cooling liquid and condensation of the vapors about existing fume nuclei in the gas current;
2. Coalescence of fume and fresh fog particles into larger complexes that are heavier and form new surfaces;
3. Centrifuging of a current of fog and coalesced particles crosswise or at right angles to the main gas current or primary path of the gas flow, thus producing an additional precipitating action which results in larger complexes in droplet form being centrifuged outwardly over the entire surfaces of the revolving screen grid and ultimately into the collecting trough.

It is evident that time is required for effecting coalescence, nuclei formation and progressive condensation or growth of fog particles into mist droplets and larger droplets that may drop out of the gas current and be centrifuged from the gas current. Further, fog particles that pass the first or lowest stage by entrainment or otherwise may continue their growth as the gas progresses upwardly through the apparatus and takes up new moisture as a result of condensation or coalescence as the gas passes through succeeding fresh fog forming and fume precipitating units or pairs of rotary and stationary screen grids. Therefore, in order to provide ample time and ample fog surfaces for all of these reactions directly in the apparatus, the lowest rotating screen grid should disintegrate more water drops into fog surfaces than is disintegrated on the rotating grid of the next succeeding second unit, and this second rotating screen grid should disintegrate more than is disintegrated on the rotating screen grid of the next succeeding third unit, thus leaving the top rotating screen grid of the fourth unit free to centrifuge out any remaining entrainment.

Upon leaving the rotating screen of the first fog forming and fume precipitating unit, the gas is immediately arrested in its upwardly whirling motion by the adjacent stationary cooperating screen grid thereabove. This sudden change of direction of the gas causes the momentum thereof to impact entrained moisture fume particles, carried through the lower rotating screen grid by the gas, against the mesh of the stationary screen grid, thus disrupting the gas films adhering to the moisture-fume particles and to the meshes of the screen grid and causing such moisture-fume particles to lodge thereon. As previously described, their rapid or gradual coalescence will result in larger drops ultimately forming and dripping back through the rising gas current and onto the rotating screen grid where they will be centrifuged rapidly outwardly to the collecting rim 66.

This process is repeated on each of the next succeeding screen grid pairs or units until the gas reaches the uppermost unit or pair of screen grids which are unsprayed and therefore centrifuge the remaining moisture from the gas.

The lowest unit or pair of screen grids thus removes the major portion of the fume particles while succeeding units remove progressively decreasing amounts since when later reaching the subsequent units the gas contains larger though fewer moisture-fume particles, and therefore gradually decreasing quantities of the spray liquid need only be supplied to the succeeding units.

While the water and fume centrifuged outwardly from each of the rotary screen grids is preferably collected and maintained from returning to others of said units of rotary and stationary screen grids by the collecting troughs 66, nevertheless it is again used as the medium for the primary cone section scrubbing operation. In this manner no more water is required for the entire cleaning operation than is required by other prior commercial apparatus.

Re-use of the secondary cleaning water or liquid for the primary scrubbing operation is effected without however the disadvantage of having the freshly forming fog washed down and the fresh cooling liquid warmed before it is disintegrated into fog, by spent liquid passing from one unit to the other on its way for re-use as the liquid medium for the primary scrubbing operation in the cone sections. To accomplish this, the water from each rotary screen grid that is collected in the troughs 66 flows from each trough into a pocket 78 connected to a pipe 79. Each pipe 79 passes downwardly through the succeeding lower troughs in such manner as not to be communicably connected therewith, and is sealed against gas flow in the contents of and discharges into a special launder 80 having a by-pass 81 to by-pass liquid from the primary cone section. Thus each trough 66 is provided with a drain individual thereto and sealed in the lowermost launder trough 80 at 82.

The pipes 79 are shown on the present drawings as being projected in one plane. However, for certain purposes, I also contemplate and prefer arranging the pipes in staggered relationship with the pipes for each unit offset relative to the pipes for the unit next above.

The by-pass line 81 from the special launder 80 is automatically controlled by an automatically, preferably thermostatically, controlled by-pass valve 83 adapted for varying the amount of water that by-passes the primary cone section and flows out of the apparatus and thereby regulates the quantity of water that overflows the annular rim of the special launder to the uppermost cone section and that is supplied to the cone sections to effect the primary scrubbing operation hereinabove described. In the secondary cleaning stages this water is of course heated by the gas and as it passes from one cone section to the other it accumulates further heat and thereby rapidly saturates the gas.

In blast furnace gas cleaning, the temperature of the gas entering the apparatus may vary from 200° F. to 600° F. Consequently, less water is required for saturating and cooling the gas entering at a relatively low temperature and considerably more for cooling and saturating the gas at a higher temperature. Furthermore, with gas entering at relatively lower temperature, the more water or the colder the water that is supplied, the less will be the degree of saturation. Control of the temperature of the gas and its saturation is therefore preferably effected, in the present embodiment of the invention, by controlling the amount of liquid diverted from entering the cone sections, by and in accordance with the temperature of the gas leaving such sections. To accomplish this, the amount of liquid passing through the valve 83 in the by-pass line 81 is regulated by regulating the valve 83 by means controlled by temperature-responsive means of usual and well known construction. An ordinary automatic temperature controller of well known construction, such as a TAG controller, is especially suitable for the purpose. Such a controller consists of two principal parts, a temperature measuring element that is sensitive to temperature changes, and a valve operated by compressed air, which manipulates the by-pass valve to vary the amount of liquid by-passed from the launder 80. Fig. 1, illustrates diagrammatically one method and arrangement for employing the control.

The by-pass valve 83 is installed in a line 84 leading from the by-pass line 81 to an effluent discharge means 94. The size of the valve 83 is so chosen that it will not take the full flow of water collecting in the launder 80, thus insuring a certain minimum flow of liquid for primary cleansing and humidifying or saturation at all times.

The sensitive temperature responsive element 85 is placed within the shell between the top cone 46 and the spray pipes 71 for the lowermost fog forming and fume precipitating unit of stationary and rotary screen grids, where it will best be subject to the influence of the temperature changes of the gas flowing upwardly from the primary treatment zone. The recorder and controller 86 is placed at a convenient point where it can be easily observed, and is connected to the temperature element 85 by means of the usual actuating tube. Compressed air line 88 is brought through the usual drip well or air filter 89 and thence to the usual proper reducing and safety valves 90 to the controller 86 and thence to the usual diaphragm 91 adapted for operating the controlling by-pass valve 83. Such group of instruments represent and embody the usual and well known principles involved in well known automatic valve operating devices controlled by slight temperature changes.

The automatic valve operating device is, in the present instance, set so that with any increase in gas temperature above a temperature arbitrarily set at the controller causes the air pressure in the air line to act on the diaphragm and close the by-pass valve so that less or no liquid is diverted through the by-pass line. Consequently, more water will overflow the launder to the primary scrubbing zone of cone sections and the gas will be rapidly cooled. And conversely, any decrease in gas temperatures below the temperature arbitrarily set at the controller causes the diaphragm in the air line to be relieved of air pressure so that a spring beneath the diaphragm may open the valve and more liquid from the launder will be diverted through the by-pass line. Consequently, less water will overflow the launder to the primary scrubbing zone of cone sections. Wherefore the by-pass valve will open and close or vary its opening with a temperature change of less than one degree. This insures a proper saturation of the primary cleaned gas flowing to the fog forming and fume precipitating zone above the primary scrubbing zone. The dirty hot spent liquid issuing from the bottom outlet 53 passes through a drain 92, sealed as shown at 93 to prevent escape of gas, and thence to an effluent discharge means 94. The dirty liquid being diverted through the by-pass line 81 passes through a similar seal 95 and thence discharges into the same effluent discharge means 94.

The invention as hereinabove set forth or exemplified may be variously practiced or embodied within the scope of the claims hereinafter made.

I claim:

1. In a gas washer comprising a shell having a lower gas inlet and an upper gas outlet; a plurality of gas scrubbing units arranged one above the other in the lower portion of the shell and each comprising a rotatable cone adapted for picking up and outwardly centrifuging coarse streams of scrubbing water in the path of gas flow therethrough, and a lower water pan adapted for collecting and recirculating such water to the cone and for the countercurrent overflow of water and passage of gas therethrough; a plurality of fresh fog forming and fume precipitating units arranged one above the other above said scrubbing units and each comprising a rotary woven wire grid and a cooperating stationary woven wire grid thereabove and both adapted for passage of gas therethrough; sealing means adapted for preventing gas from by-passing said grids during gas flow therethrough; means for supplying fresh cooling liquid to each of said fresh fog forming and fume precipitating units and adapted to direct such liquid in the form of a spray upwardly against the bottom of the rotary grids of the respective units during their rotation and passage of gas therethrough; means for draining liquid centrifuged off by the respective rotary grids away from the other fog forming and fume precipitating units; means for delivering such drained liquid to said scrubbing units; and a final drier unit comprising a lower rotary and an upper stationary woven wire grid disposed out of the path of liquid supplied to said shell and interposed between the uppermost fog forming and fume precipitating unit and the upper gas outlet.

2. In a gas washer comprising a shell having a lower gas inlet and an upper gas outlet; a plurality of gas scrubbing units arranged one above the other in the lower portion of the shell and each comprising a rotatable cone adapted for picking up and outwardly centrifuging coarse streams of scrubbing water in the path of gas flow therethrough, and a lower water pan adapted for collecting and recirculating such water to the cone and for countercurrent overflow of water and passage of gas therethrough; a plurality of fresh fog forming and fume precipitating units arranged one above the other above said scrubbing units and each comprising a rotary woven wire grid and a cooperating stationary woven wire grid thereabove and both adapted for passage of gas therethrough; sealing means adapted for preventing gas from by-passing said grids during gas flow therethrough; means for supplying fresh cooling liquid to each of said fog forming and fume precipitating units and adapted to direct such liquid in the form of a spray upwardly against the bottoms of the rotary grids of the respective units during their rotation and passage of gas therethrough; and means for draining liquid centrifuged off by the respective rotary grids away from the other fog forming and fume precipitating units.

3. In a gas washer comprising a shell having a lower gas inlet and an upper gas outlet; at least one gas scrubbing unit in the lower portion of the shell comprising a rotatable cone adapted for picking up and outwardly centrifuging coarse streams of scrubbing water in the path of gas flow therethrough, and a lower water pan therefor adapted for collecting and recirculating such water to the cone and for countercurrent overflow of water and passage of gas therethrough; a plurality of fresh fog forming and fume precipitating units arranged one above the other above said scrubbing unit and each comprising a rotary woven wire grid and a cooperating stationary woven wire grid thereabove and both adapted for passage of gas therethrough; and means for supplying fresh cooling liquid to each of said fresh fog forming and fume precipitating units and adapted to direct such liquid in the form of a spray upwardly against the bottoms of the rotary grids of the respective units during their rotation and passage of gas therethrough.

4. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethrough; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids.

5. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethrough; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids; and regulating means adapted for effecting supply of a greater quantity of fresh liquid to the lowermost fresh fog forming and fume precipitating unit and decreasing quantities of fresh liquid to each successive unit.

6. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethorugh; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids; and a final drier unit, comprising a lower rotary woven wire grid and an upper cooperating stationary fume precipitating means thereabove adapted to effect diffusing of gas passing therethrough, disposed out of the path of the liquid supplies to said shell and interposed between the uppermost fog forming and fume precipitating unit and the upper gas outlet.

7. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethrough; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids; and stationary sealing means interposed between said shell and said rotary grids and adapted to minimize by-passing of gas around the respective rotary grids.

8. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethrough; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids; means adjacent the outer portions of the respective rotary grids and adapted for collecting liquid centrifuged off by the respective rotary grids and maintaining said collected liquid from passing to the other rotary grids.

9. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethrough; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids; means adapted for by-passing liquid centrifuged off by the respective grid past the other fog forming and fume precipitating units and for conducting such liquid to the aforesaid scrubbing units.

10. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethrough; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids; means adapted for by-passing liquid centrifuged off by the respective grid past the other fog forming and fume precipitating units and for conducting such liquid to the aforesaid scrubbing units; and means adapted for effecting automatic diversion of part of such by-passed liquid from entering the scrubbing units.

11. In a gas washer comprising a shell having a lower gas inlet and an upper gas outlet; a rotatable shaft extending axially through said shell; at least one gas scrubbing unit in the lower portion of said shell comprising a rotatable cone secured to said shaft for rotation therewith and adapted to pick up and centrifuge liquid outwardly in coarse streams in the path of gas flow from said inlet during rotation of said shaft, and a lower water pan adapted to collect and recirculate such water to the cone and to effect overflow of water and passage of gas therethrough; a plurality of fresh fog forming and fume precipitating units arranged one above the other between said scrubbing unit and said gas outlet and each comprising a rotary woven wire grid extending outwardly from said shaft and secured thereto for rotation thereby and a stationary fume precipitating means adapted to effect diffusing of gas passing therethrough and extending inwardly from said shell in parallel relationship with said rotary grid; fresh liquid supply means adapted for supplying fresh cooling liquid to each of said fresh fog forming and fume precipitating units individually and adapted to direct such liquid in the form of a spray against the surfaces of the rotary grids of the respective units whereby to effect disintegration of the fresh sprays into fog by the rotary grids during the rotation and passage of gas through the respective rotary grids; means adapted for by-passing liquid centrifuged off by the respective grids past the other fog forming and fume precipitating units and for conducting such liquid to the aforesaid scrubbing units; means adapted for effecting automatic diversion of part of such by-passed liquid from entering the scrubbing units; and means responsive to the temperature of the gas in the scrubbing units and adapted for increasing or decreasing such diversion in accordance with the decrease and increase, respectively, of the temperature of the gas in said scrubbing units.

12. In a gas washer comprising primary cleaning means adapted for effecting a primary scrubbing of the gas with relatively coarse streams of water to remove the coarser dust therefrom; a plurality of fresh fog forming and fume precipitating units adapted to receive gas from said primary cleaning means and arranged one above the other for gas flow in series therethrough and each comprising a rotatable spray disintegration means adapted to disintegrate spray into finer fog and to centrifuge fog and gas into contact with each other during gas flow therethrough and a stationary fume precipitation means adapted to effect diffusing of gas passing therethrough and arranged in parallel relationship with said rotatable spray disintegration means; and means for supplying fresh cooling liquid to each of said units and adapted to direct such liquid in the form of spray against the surfaces of the rotary spray disintegration means of the respective units so as to effect centrifuging of gas and freshly forming fog into contact with each other during passage of gas through the respective units.

13. In a gas washer comprising primary cleaning means adapted for effecting a primary scrubbing of the gas with relatively coarse streams of water to remove the coarser dust therefrom; a plurality of fresh fog forming and fume precipitating units adapted to receive gas from said primary cleaning means and arranged one above the other for gas flow in series therethrough and each comprising a rotatable spray disintegration means adapted to disintegrate spray into finer fog and to centrifuge fog and gas into contact with each other during gas flow therethrough and a stationary fume precipitation means adapted to effect diffusing of gas passing therethrough and arranged in parallel relationship with said rotatable spray disintegration means; means for supplying fresh cooling liquid to each of said units and adapted to direct such liquid in the form of spray against the surfaces of the rotary spray disintegrator means of the respective units so as to effect centrifuging of gas and freshly forming fog into contact with each other during passage of gas through the respective units; and means adapted for maintaining liquid centrifuged out of the gas stream by the respective rotatable spray disintegration means from returning to the said units.

14. In a gas washer comprising primary cleaning means adapted for effecting a primary scrubbing of the gas with relatively coarse streams of water to remove the coarser dust therefrom; a plurality of fresh fog forming and fume precipitating units adapted to receive gas from said primary cleaning means and arranged one above the other for gas flow in series therethrough, each of said units comprising a rotary woven wire grid and a stationary fume precipitation means adapted to effect diffusing of gas passing therethrough and arranged in parallel relationship with the rotary woven wire grid; and means for supplying fresh cooling liquid to each of said units and adapted to direct such liquid in the form of spray against the surface of the rotary grids of the respective units so as to effect centrifuging of gas and freshly forming fog into contact with each other during passage of gas through the respective units.

15. In a gas washer comprising primary cleaning means adapted for effecting a primary scrubbing of the gas with relatively coarse streams of water to remove the coarser dust therefrom; a plurality of fresh fog forming and fume precipitating units adapted to receive gas from said primary cleaning means and arranged one above the other for gas flow in series therethrough, each of said units comprising a rotary woven wire grid and a stationary fume precipitation means adapted to effect diffusing of gas passing therethrough and arranged in parallel relationship with the rotary woven wire grid; means for supplying fresh cooling liquid to each of said units and adapted to direct such liquid in the form of spray against the surface of the rotary grids of the respective units so as to effect centrifuging of gas and freshly forming fog into contact with each other during passage of gas through the respective units; and means adapted for maintaining liquid centrifuged out of the gas stream by the respective rotary grids from returning to said units.

16. In a gas washer comprising primary washing means adapted for scrubbing the coarser dust therefrom and secondary cleaning means adapted for effecting contact of spray with fume of the gas to remove fume therefrom in advance of passage of the gas to an outlet therefor; a final drier unit comprising a spray-free cooperating pair of rotary and stationary finely woven wire grids interposed between the secondary cleaning means for the gas and the outlet therefor.

17. In a gas washer comprising primary washing means adapted for scrubbing the coarser dust therefrom and a secondary cleaning means comprising a succession of condensation units adapted for effecting progressive condensation of moisture and cooling of the gas with condensation media freshly supplied to the respective condensation units, the combination of means adapted for conducting condensation media drawn off from the respective units to the primary washing means; means for diverting a portion of such media from passing to the primary washing means; and means controlled by the temperature of the gas for regulating the diversion means.

18. In a gas washer comprising primary washing means adapted for scrubbing the coarser dust therefrom and a secondary cleaning means comprising a succession of condensation units adapted for effecting progressive condensation of moisture and cooling of the gas with condensation media freshly supplied to and drawn off from the respective units individually, the combination of means for conducting condensation media drawn off from the respective units to the primary washing means; means for diverting a portion of such media from passing to the primary washing means; and means controlled by the temperature of gas in the primary washing means for regulating the diversion means.

19. The method of washing gas which comprises: subjecting the gas while hot to a rough washing with coarse streams of flowing water and thereby removing the coarser particles of solid matter from and saturating the gas with water vapor; then passing the gas through a series of sprays of fresh liquid in succession; subjecting the respective sprays to a rapidly moving spray disintegrating medium so as to form fog surfaces therefrom directly in the gas current; and subjecting the gas to diffusion through a stationary precipitating medium, presenting intricate tortuous but free passages to the flow of gas, after the gas passes each of the moving spray disintegrating media and before the gas passes to the next thereof.

20. The method of washing gas which comprises: subjecting the gas while hot to a primary washing with water to remove the coarser particles of solid matter from the gas and then subjecting the gas leaving such primary washing stage to a plurality of secondary fog forming and fume precipitating stages with separately supplied fresh washing water for the respective stages; and subjecting the gas at the first of the fume precipitating stages after the primary washing stage to a larger proportion of freshly supplied water than at a following fume precipitation stage.

21. The method of washing gas which comprises: subjecting the gas while hot to a primary washing with water to remove the coarser particles of solid matter from the gas and then subjecting the gas leaving such primary washing stage to a succession of secondary fog forming and fume precipitating stages with separately supplied fresh washing water for the respective stages; and subjecting the gas as it passes from the primary stage through the secondary stages to gradually decreasing quantities of fresh water at each of the succeeding stages in amounts proportionate to the decreasing fume content of the gas leaving each secondary fume precipitation stage.

22. The method of washing gas which comprises subjecting the gas while hot to a rough washing with flowing water and thereby removing the coarser particles of solid matter from and saturating the gas with water vapor; then subjecting the gas to a secondary cleaning with finely divided spray; passing the spent wash water from the secondary stage to the primary stage, and controlling the temperature of the gas passing from the primary stage to the secondary stage by regulating the quantity of water passing from the secondary stage to the primary stage by and in accordance with the temperature of the treated gas.

23. In the cleaning of a current of gas with a liquid medium, the method comprising: subjecting the gas flow to the washing action of a water-spray that is centrifuged substantially at right angles across the primary direction of the gas flow, progressively accelerating the velocity of the centrifuged water-spray, and increasing the volume thereof as such spray is centrifuged outwardly across and to the outer limit of the primary path of the gas flow, whereby a substantially uniform distribution of spray and of flow-resistance for the gas may be maintained across all the primary path of the gas flow.

24. In the cleaning of a current of gas with a liquid medium, the method comprising: centrifuging a current of liquid-medium outwardly crosswise through the primary path of the gas flow, progressively accelerating the velocity of the centrifuged liquid-medium by centrifugal force as it progresses outwardly crosswise through the primary path of the gas flow, and increasing the volume of such liquid-medium as it becomes accelerated and spreads outwardly across and to the outer limit of the primary path of gas flow, whereby a substantially uniform distribution of the liquid medium and of flow-resistance for the gas may be maintained across the primary path of the gas flow.

25. In the cleaning of a current of gas with a liquid medium, the method comprising: subjecting the gas flow to the washing action of a fog that is centrifuged substantially at right angles across the primary direction of the gas flow, accelerating the velocity of the centrifuged fog, and increasing the volume thereof as such fog is centrifuged outwardly across and to the outer limit of the primary path of the gas flow, whereby a substantially uniform distribution of fog and of flow-resistance for the gas may be maintained across all the primary path of the gas flow.

26. The method of washing gas which comprises: subjecting the gas while hot to a rough washing with centrifuged coarse streams of flowing water and thereby removing the coarser particles of solid matter from and saturating the gas with water vapor; then passing the gas through a series of stages of sprays of fresh liquid in succession; subjecting the respective sprays to disintegration so as to form fine fog surfaces from the sprays directly in the gas current and passing the gas through the disintegrating sprays during the disintegrating of the sprays into fog; diffusing the fog and gas, at each spray stage and before they pass to a next spray stage, through a rapidly moving diffusing medium presenting intricate tortuous but free passages to the flow of gas and thereby effecting, by the momentum of the diffusing medium, intimate mixing of the gas with the freshly formed fog surfaces; and arresting the gas and subjecting it to quiescent diffusion through a precipitating medium presenting intricate tortuous but free passages to the flow of gas, after the gas passes each rapidly moving diffusing medium.

27. The method of washing gas which comprises: subjecting the gas while hot to a rough washing with coarse streams of flowing water and thereby removing the coarser particles of solid matter from the gas and saturating the gas with water vapor; then passing the gas through a series of stages of secondary sprays of fresh cooling liquid in succession, to remove traces of fume from the gas; subjecting the respective sprays during gas flow therethrough to a disintegration so as to form fine fog surfaces from the sprays directly in the gas current; diffusing the gas and fine fog at each spray stage and before they pass to a next spray stage through a rotating diffusing medium presenting intricate tortuous free passages for gas and thereby centrifuging the fume of the gas and the fog into intimate contact with each other; and centrifuging precipitated mist and fume out of the gas current at each of the aforesaid stages.

28. The method of washing gas which comprises: subjecting the gas while hot to a rough washing with coarse streams of flowing water and thereby removing the coarser particles of solid matter from and saturating the gas; then passing the gas through a succession of stages of sprays of fresh liquid to remove traces of fume from the gas; subjecting the respective sprays during gas flow therethrough to disintegration so as to form fine fog surfaces therefrom directly in the gas current; diffusing the gas and fine fog at each spray stage and before they pass to a next spray stage through a rotating diffusing medium and thereby centrifuging the gas and the freshly formed mist surfaces into intimate contact with each other; centrifuging precipitated mist and fume out of the gas current at the respective spray stages; changing the direction of flow of the gas as it leaves each of the rotating diffusing media and subjecting it to passage through a quiescent precipitation medium, presenting intricate tortuous but relatively free passages to the flow of gas, after it leaves each of the rotating diffusing media.

29. The method of washing gas which comprising: subjecting the gas while hot to a rough washing with coarse streams of flowing water and thereby removing the coarser particles of solid matter from the gas and saturating the gas with water vapor; then passing the gas through a series of stages of secondary sprays of fresh cooling liquid in succession, to remove traces of fume from the gas; subjecting the respective sprays during gas flow therethrough to disintegration so as to form fine fog surfaces from the sprays directly in the gas current; diffusing the gas and fine fog at each spray stage and before passing to a next spray stage through a rotating diffusing medium and thereby centrifuging the fume of the gas and the fog into intimate contact with each other during diffusion thereof; centrifuging precipitated mist and fume out of the gas current at the respective spray stages; collecting the precipitated fog and fume centrifuged out of the gas current at the respective spray stages; and maintaining the collected fog and fume out of contact with the other sprays of the series thereof and out of contact with gas passing from one spray stage to another.

30. The method of washing gas which comprises: subjecting the gas while hot to a rough washing with coarse streams of flowing water and thereby removing the coarser particles of solid matter from the gas and saturating the gas with water vapor; then passing the gas through a series of stages of secondary sprays of fresh cooling liquids in succession, to remove traces of fume from the gas; subjecting the respective sprays during gas flow therethrough to disintegration so as to form fine fog surfaces from the sprays directly in the gas current; diffusing the gas and fine fog at each spray stage and before they pass at a next spray stage through a rotating diffusing medium and thereby centrifuging the fume of the gas and the fog into intimate contact with each other during diffusion thereof; centrifuging precipitated mist and fume out of the gas current at the respective spray stages; collecting the precipitated fog and fume centrifuged out of the gas current at the respective spray stages; maintaining the collected fog and fume out of contact with the sprays of other stages of the series thereof and out of contact with gas passing from one spray stage to another; and effecting the aforesaid rough washing therewith.

31. The method of washing gas which comprises: subjecting the gas while hot to a rough washing with coarse streams of flowing water and thereby removing the coarser particles of solid matter from the gas and saturating the gas with water vapor; then passing the gas through a series of stages of secondary sprays of fresh cooling liquids in succession, to remove traces of fume from the gas; subjecting the respective sprays during gas flow therethrough to disintegration so as to form fine fog surfaces from the sprays directly in the gas current; diffusing the gas and fine fog at each spray stage and before passing to a next spray stage through the rotating diffusing medium and thereby centrifuging the fume of the gas and the fog into intimate contact with each other during diffusion thereof; centrifuging precipitated mist and fume out of the gas current at the respective spray stages; collecting the precipitated fog and fume centrifuged out of the gas current at the respective spray stages; maintaining the collected fog and fume out of contact with the sprays of the other stages of the series thereof and out of contact with gas passing from one spray stage to another; effecting the aforesaid rough washing therewith; and regulating the saturation of the gas passing from the rough washing stage to the series of stages of secondary sprays by controlling the quantity of water passed to the rough washing stage from the secondary spray stages by and in accordance with the temperature of the treated gas.

32. The method of washing gas which comprises: subjecting the gas while hot to a rough washing with coarse streams of flowing water and thereby removing the coarser particles of solid matter from and saturating the gas with water vapor; then passing the gas in succession through a series of stages of secondary sprays of gradually decreasing quantities of fresh liquid to remove traces of fume from the gas; subjecting the sprays of each stage during gas flow therethrough to disintegration so as to form finer fog surfaces therefrom directly in the gas current; diffusing the gas and fine fog through a rotating diffusing medium in each of the respective spray stages and thereby centrifuging the fume of the gas and the fog surfaces into intimate contact with each other during diffusion thereof; and centrifuging precipitated mist and fume out of the gas current at the respective secondary spray stages.

33. The method of washing gas which comprises: subjecting the gas while hot to a rough washing with coarse streams of flowing water and thereby removing the coarser particles of solid matter from and saturating the gas with water vapor; then passing the gas in succession through a series of stages of secondary sprays of gradually decreasing quantities of fresh liquid to remove traces of fume from the gas; subjecting the sprays of the respective stages thereof and during gas flow therethrough to disintegration so as to form fine fog surfaces therefrom directly in the gas current in each stage; diffusing the gas and fog through a rotating diffusing medium in each of the respective spray stages thereby centrifuging the fume of the gas and the fog surfaces into intimate contact with each other during centrifuging thereof; centrifuging precipitated mist and fume out of the gas current at the respective spray stages; collecting the precipitated fog and fume centrifuged out of the gas current at the respective spray stages; and maintaining the collected mist and fume out of contact with the sprays of the other stages of the series thereof and out of contact with gas passing from one spray stage to another.

34. The method of washing gas which comprises: subjecting the gas while hot to a rough washing with coarse streams of flowing water and thereby removing the coarser particles of solid matter from and saturating the gas with water vapor; then passing the gas in succession through a series of stages of secondary sprays of gradually decreasing quantities of fresh liquid to remove traces of fume from the gas; subjecting the sprays of the respective stages thereof and during gas flow therethrough to disintegration so as to form finer fog surfaces therefrom directly in the gas current in each stage; diffusing the gas and fog through a rotating diffusing medium in each of the respective spray stages and thereby centrifuging the fume of the gas and the fog surfaces into intimate contact with each other during diffusing thereof; centrifuging precipitated mist and fume out of the gas current at the respective spray stages; collecting the precipitated fog and fume centrifuged out of the gas current; maintaining the collected mist and fume out of contact with the sprays of the other stages of the series thereof and out of contact with gas passing from one spray stage to another; and effecting the aforesaid rough washing therewith.

In testimony whereof I have hereunto set my hand.

ALBERT L. GENTER.